June 17, 1930.

C. G. NELSON

Re. 17,706

SASH CONSTRUCTION

Original Filed Aug. 15, 1927

Inventor

Charles G. Nelson

By Owen & Owen

Attorneys

Reissued June 17, 1930 Re. 17,706

UNITED STATES PATENT OFFICE

CHARLES G. NELSON, OF CHICAGO HEIGHTS, ILLINOIS, ASSIGNOR TO ZOURI DRAWN METALS COMPANY, OF CHICAGO HEIGHTS, ILLINOIS, A CORPORATION OF ILLINOIS

SASH CONSTRUCTION

Original No. 1,687,305, dated October 9, 1928, Serial No. 212,936, filed August 15, 1927. Application for reissue filed April 21, 1930, Serial No. 446,112.

This invention relates to sash construction especially adapted for use in store fronts and the like for setting plate glass.

The object of the invention is to provide a simple and improved device, which may be easily secured in position to clamp the glass, and which may be easily adjusted to exert the desired pressure on the glass without injury thereto.

The novel features of the invention and the advantages thereof will be more fully explained in the following detailed description taken in connection with the accompanying drawing which illustrates various forms thereof.

Figure 1:
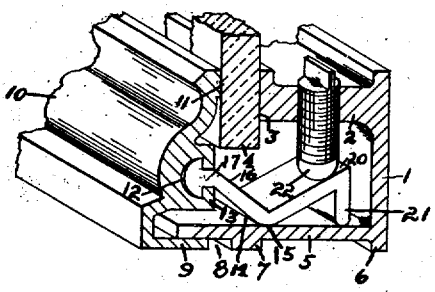
Fig. 1 is a perspective view illustrating one embodiment of the invention.
Figure 3:
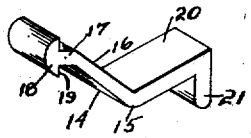
Fig. 3 is a perspective view of the draw plate as used in Figs. 1 and 2.

In the form illustrated in Fig. 1 there is provided a channel-shaped clamping member 1 having a side wall 2 terminating in a face 3 against which the glass 4 rests. The other side wall 5 of the channel member is formed with ribs 6 and 7, adapted to rest against the window frame or other support, leaving a space 8 between the side wall and its support for receiving the backwardly turned flange 9 of the face moulding 10. The upper edge of this moulding is formed with an inturned flange 11 having a face adapted to bear against the front surface of the glass 4. In order to provide means for bringing the members 1 and 10 into clamping relation to the glass the member 10 is provided on its inner face with a channel 12 having inturned side flanges 13 overhanging its edges. Cooperating with the channel 12 and flanges 13 are a number of draw plates 14, one of which is shown in Fig. 1. This draw plate is formed with a knee 15 adapted to bear against the side 5 of the inner clamping member and slopes away from the side 5, as indicated at 16, and has a laterally turned end portion 17 which extends between the flanges 13 and terminates in a head 18 within the channel 12. The head 18 is formed with shoulders 19 adapted to engage the inner edges of the flanges 13. The other end of the draw plate also slopes away from the side wall 5, as indicated at 20, and terminates in a backwardly turned flange 21 which engages the inner face of the wall 5. A key actuated screw 22 extends through the wall 2 and has a rounded end adapted to engage the inclined surface 20 to draw the clamping member 10 inwardly as the screw 22 is advanced. As the member 10 is thus drawn into clamping relation to the glass, the engagement of the flange 9 underneath the wall or flange 5 positively prevents movement of either the member 10 or the draw plate 14 relative to the glass, except in a direction substantially perpendicular to the plane of the glass. The sloping end portion 20 of the draw plate may be of sufficient extent to allow for glass of any thickness.

Figure 2:
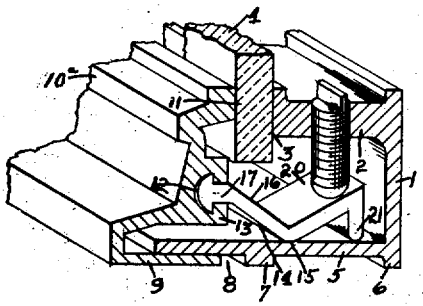
Fig. 2 is a view similar to Fig. 1, but showing a modified form of molding.

The invention as shown in Fig. 2 is similar to that shown in Fig. 1, except that the face moulding $10^a$ is of different style. It is obvious that the same principles of construction and operation may be used in connection with moulding of any style or design desired.

Figure 5:
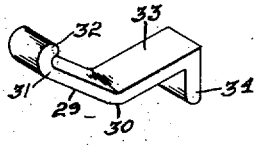
Fig. 5 is a perspective view of the draw plate shown in Fig. 4.
Figure 4:
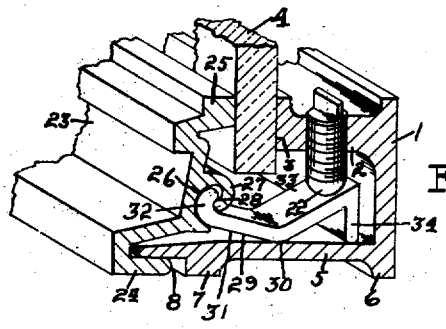
Fig. 4 is a perspective view of another embodiment of the invention.

In the form of the invention shown in Figs. 4 and 5, the inner clamping member 1 is substantially the same as in Figs. 1 and 2. The outer clamping member 23 has a lower flange 24 adapted to be received in the space 8 beneath the wall 5 and has at its opposite edge a flange 25 adapted to bear against the glass 4. The channel 26 formed in the inner face of the member 23 has similarly curved side walls and has an overhanging curved flange 27 which terminates in a rounded edge 28, which is substantially at the center of curvature of the side walls of the channel. The draw plate 29 is formed with a knee 30 adapted to bear against the wall 5 of the inner clamping member 1 and has an upwardly sloping portion 31 terminating in a curved end 32 which may be inserted laterally in the channel 26 and pivots about the rounded end 28 of the flange 27. The other end of the draw plate 29 has an upwardly sloping surface 33 and terminates in a backwardly turned flange 34. The screw 22, therefore, is adapted to engage the surface 33 and to draw the moulding 23 into clamping relation to the glass in substantially the same manner as the moulding 10 or 10[a] is drawn inwardly by means of the draw plate 14.

The draw plates 14 are connected with the front face moulding by inserting the heads 18 into the end of the channel 12 and sliding them longitudinally therein to the point desired. The draw plates 29 effect the same function as the draw plates 14, but may be inserted laterally in the channel 26 and form substantially a hinged connection with the face moulding.

From the foregoing description it will be seen that I have provided a construction in which the glass may be set with the greatest facility and which is particularly adapted for use in extruded key-set sash construction. While I have shown and illustrated various forms in which the invention may be embodied, it is, of course, apparent that other modifications may be devised which will accomplish substantially the same results without any material departure from the scope of the invention as claimed.

What I claim is:

1. In a sash construction, a glass clamping member having a base flange extending in a plane perpendicular to the plane of the glass, a second clamping member having a base flange engaging the underside of the first mentioned flange, one of said clamping members having on its inner face a channel with an overhanging shoulder, a draw plate having a head engageable with said shoulder, and means connected with the other clamping member and cooperating with the draw plate to cause its head to bear against said shoulder and draw the clamping members into clamping relation to the glass.

2. In a sash construction, a supporting member against which the rear face of the glass rests, a forwardly extending base flange on said supporting member, a face moulding having a base flange engaging the underside of said forwardly extending flange, said moulding having on its inner face a channel with an overhanging shoulder, a draw plate between said supporting member and said moulding and having a head engageable with said shoulder, and means operable from behind the glass to actuate said draw plate to cause its head to bear against said shoulder and draw the moulding into clamping engagement with the glass.

3. In a sash construction, a front clamping member, a rear clamping member, one of said clamping members having parallel flanges on its inner face between its upper and lower edges, said flanges forming a channel between them, at least one of said flanges having an inturned lip overhanging said channel, a draw plate having a head engageable with said lip, and means connected with the other clamping member and cooperating with the draw plate to cause its head to bear against said lip and draw the two clamping members into clamping relation to the glass.

4. In a sash construction, a glass clamping member having a base flange extending in a plane perpendicular to the plane of the glass, a second clamping member having a base flange engaging the underside of the first mentioned flange, one of said clamping members having parallel flanges on its inner face between its upper and lower edges, said flanges forming a channel between them, at least one of said flanges having an inturned lip overhanging said channel, a draw plate having a head engageable with said lip, and means for acting on said draw plate to cause its head to bear against said lip and draw the two clamping members into clamping relation to the glass.

5. In a sash construction, a glass clamping member having a base flange extending in a plane perpendicular to the plane of the glass, a second clamping member having a base flange engaging the underside of the first mentioned flange, one of said clamping members being formed on its inner face with a pair of intermediate flanges spaced above the base flanges and defining a channel with one of said intermediate flanges overhanging the channel, a draw plate resting upon the upper base flange with one end portion inclined upwardly from the base flanges and terminating in a head which engages the overhanging flange, said draw plate having an upper surface which slopes upwardly toward the other end of the plate, and means for bearing against said sloping surface to draw the two clamping members into clamping relation to the glass.

6. In a sash construction, a supporting member against which the rear face of the glass rests, a forwardly extending base flange on said supporting member, a face moulding having a base flange engaging the underside of said forwardly extending flange, said moulding having on its inner face a pair of intermediate flanges spaced above the base flanges and defining a channel with one of said intermediate flanges overhanging the channel, a draw plate resting upon the upper base flange and having its front end inclined forwardly and upwardly and terminating in a head which engages said overhanging flange, the rear portion of said draw plate having a rearwardly and upwardly sloping upper surface, and means for bearing against said sloping surface to draw the two clamping members into clamping relation to the glass.

7. In a sash construction, the combination of two clamping members adapted to receive the glass between them, the inner face of one clamping member having formed between its edges with flanges having transversely curved opposed surfaces defining a channel which is substantially arcuate in cross section, a draw plate terminating at one end in a curved head adapted to be inserted laterally into the channel by a pivotal movement, and means cooperating with the other clamping member to force said draw bar in a direction to bring said clamping members into clamping relation to the glass.

8. In a sash construction, the combination of two clamping members adapted to receive the glass between them, the inner face of one clamping member being formed between its edges with flanges having transversely curved opposed surfaces defining a channel which is substantially arcuate in cross section, a draw plate terminating at one end in a curved head adapted to be inserted laterally into the channel by a pivotal movement to form an interlocking connection, means engaging said flanged clamping member and said draw plate, when the device is assembled, to hold them in interlocking relation, and means cooperating with the other clamping member to force said draw bar in a direction to bring the clamping members into clamping relation to the glass.

9. In a sash construction, a glass clamping member having a base flange extending in a plane perpendicular to the plane of the glass, a second clamping member having a base flange engaging the underside of the first mentioned flange, a draw plate, a connection between the draw plate and one of said clamping members, said connection including an overhanging shoulder on one of the parts connected and a head on the other part engageable with said shoulder, and means connected with the other clamping member and cooperating with the draw plate to cause said head to bear against said shoulder and draw the two clamping members into clamping relation to the glass.

10. In a sash construction, a front clamping member, a rear clamping member, one of said clamping members having a flange on its inner face between the upper and lower edges thereof, said flange having an overhanging lip, a draw plate having a head engaging said lip, means cooperating with the other clamping member and the draw plate to cause said head to bear against said lip and draw the two clamping members into clamping relation to the glass, and means for holding said draw plate and said flanged clamping member against relative movement except in a direction substantially perpendicular to the plane of the glass.

11. In a sash construction, a glass clamping member having a portion engageable with a face of the glass, and a base flange normally perpendicular to the plane of the glass, a second clamping member engaging said base flange and the opposite face of the glass, one of said clamping members having an intermediate flange on its inner face, a draw plate having a lip engaging said intermediate flange, and means cooperating with the drawplate to draw the latter and the clamping member with the intermediate flange toward the other clamping member to clamp the glass.

12. In a sash construction, a front clamping member and a rear clamping member adapted to receive a plate of glass between them, one of said clamping members having a flange on its inner face between its upper and lower edges, a draw plate having a head engageable with said flange, and means connected with the other clamping member and cooperating with the draw plate to cause said head to bear against said flange to draw the two clamping members into clamping relation with the glass.

In testimony whereof I have hereunto signed my name to this specification.

CHARLES G. NELSON.